March 3, 1942.    J. B. ARMITAGE ET AL    2,275,241
MACHINE TOOL TRANSMISSION AND CONTROL MECHANISM
Filed March 18, 1939    4 Sheets-Sheet 1

INVENTORS
Joseph B. Armitage
Orrin W. Barker
BY W. D. O'Connor
ATTORNEY

March 3, 1942.  J. B. ARMITAGE ET AL  2,275,241
MACHINE TOOL TRANSMISSION AND CONTROL MECHANISM
Filed March 18, 1939  4 Sheets-Sheet 4

INVENTORS
JOSEPH B. ARMITAGE
ORRIN W. BARKER
BY W. D. O'Connor
ATTORNEY

Patented Mar. 3, 1942

2,275,241

UNITED STATES PATENT OFFICE 2,275,241

MACHINE TOOL TRANSMISSION AND CONTROL MECHANISM

Joseph B. Armitage, Wauwatosa, and Orrin W. Barker, Milwaukee, Wis., assignors to Kearney & Trecker Corporation, West Allis, Wis., a corporation of Wisconsin Application March 18, 1939, Serial No. 262,756

29 Claims. (Cl. 90—21)

This invention relates, generally, to improvements in machine tools and more particularly to improved power transmitting and controlling mechanism for effecting automatic control of the direction and rate of operation of a machine tool element.

A general object of this invention is to provide an improved transmission and control mechanism for actuating and automatically controlling the movements of a machine tool element.

Another object of the invention is to provide improved machine tool controlling apparatus that may be adjusted readily to effect any one of several modes of automatic operation.

Another object is to provide improved reversing and rate changing control mechanism for the table driving power transmission train of a milling machine.

Another object is to provide an improved reversing and rate changing control mechanism for a machine tool table that may be adjusted readily to provide for effecting automatic reversal in the direction of movement of the table into either feed rate or rapid traverse rate selectively at either end of its course of travel.

Another object is to provide a machine tool transmission and control mechanism including feed rate and rapid traverse rate driving trains and table driving means adapted to be driven by either train, together with means operative to disengage the rapid traverse driving train automatically whenever the table driving means is disengaged from the table.

Another object is to provide control apparatus for a machine tool table driving mechanism including a feed train and a rapid traverse train together with table reversing and disconnecting means adapted to be driven by either train, the control means functioning automatically to disengage the rapid traverse train wherever the table reverser is moved to disconnecting position.

Another object is to provide rate and direction changing control apparatus for a machine tool, so arranged that upon reversing movement thereof the rate is automatically reduced to feed rate as the reversing mechanism moves through neutral position, thereby preventing clashing of the clutches when the reverser is engaged for movement in the opposite direction.

Another object is to provide reversing and rate changing control mechanism for a machine tool, interlocked in such manner that the rapid traverse rate driving mechanism can not become effective until after the reversing mechanism has been engaged for movement in the one or the other direction.

A further object is to provide improved valve mechanism for regulating the operation of the hydraulic control system of a machine tool.

According to this invention, a machine tool having a movable member is provided with improved automatically actuated control mechanism for effecting change in the direction of movement of the member at predetermined terminal points in its path of travel, the movement in reverse direction being effected selectively either at feed rate or at rapid traverse rate automatically. The control system is preferably hydraulically actuated, trip dogs being arranged to move a reversing control valve which functions to energize a piston and cylinder reverser shifting mechanism. The reversing control valve is also selectively operable to effect power movement of a rate changing valve, the arrangement being such that the rate of movement may be changed automatically subsequent to completion of a change in the direction of movement. A single manually actuated selector valve may be positioned to determine the rate at which reversal will occur at the ends of the path of movement, or separately operated selector valves may be provided for each end of the path, whereby reversal into either rate may be effected at either end of the path of travel. In a modification, a similar selective effect is obtained by providing an auxiliary trip plunger adjacent to each reversing plunger to control the rate at which reversal occurs, and alternatively the auxiliary plungers may be replaced by selectively operable connecting linkages arranged to be actuated directly by the reversing control plungers to control the rate of reverse travel at either end of the course of movement of the movable member. The rapid traverse driving mechanism is preferably so arranged that it can be engaged only after the reversing mechanism has been engaged to effect movement in one or the other direction, the arrangement being such that the rapid traverse drive is automatically disengaged whenever the reversing mechanism is disengaged, thereby obviating the risk of accidentally engaging the reversing clutches while they are operating at rapid traverse rate.

The invention is exemplified herein by several embodiments illustrated diagrammatically in connection with a general representation of a typical machine tool structure; however, it is to be understood that these particular embodiments are intended to be illustrative only and that various other structural forms, all within the range of equivalents of the features defined in the subjoined claims, may be employed in practicing this invention in connection with any of various machine tools or similar apparatus.

The foregoing and other objects of this invention, which will become more fully apparent from the following detailed specification setting forth the several illustrative embodiments, may be achieved by the particular apparatus depicted in and described in connection with the accompanying drawings, in which.

Figure 1:
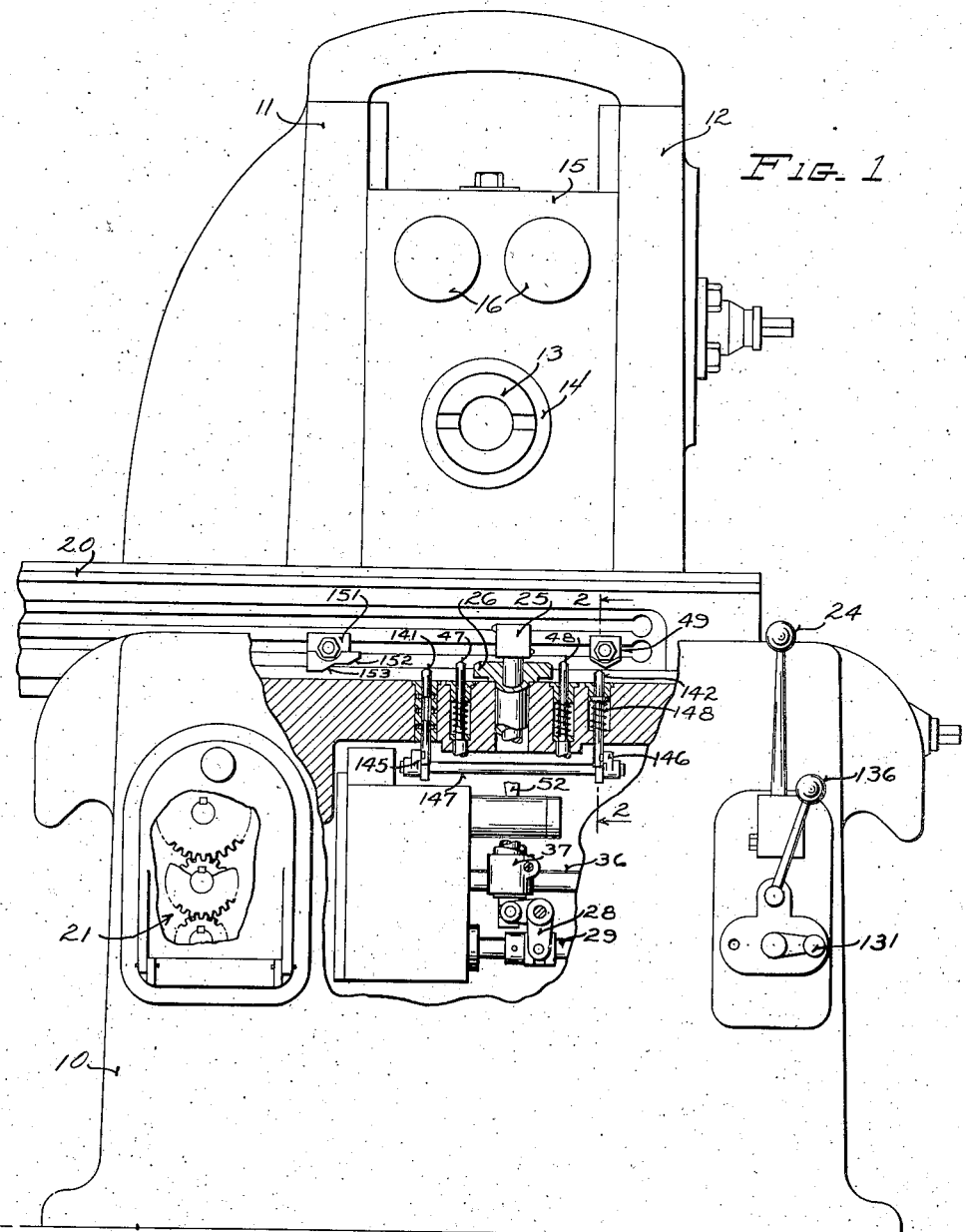
Figure 1 is a view in front elevation of a milling machine exemplifying a machine tool of the type in which the present invention may be incorporated to advantage, parts of the machine frame having been broken away to better show some of the control mechanism.

The particular machine tool illustrated generally in Fig. 1 of the drawings as exemplifying apparatus of the class adapted to be controlled in accordance with the principles of the present invention, is a milling machine of the bed type generally similar in structure to the machine shown and described in detail in U. S. Patent No. 2,077,434, issued April 20, 1937, and in U. S. Patent No. 2,118,357, issued May 24, 1938. Referring more specifically to Fig. 1, the milling machine structure there shown comprises essentially a hollow bed or base 10 that constitutes the main frame or foundation of the machine and forms a housing for the driving mechanism and the controlling apparatus. On its upper rear surface, the base 10 supports a pair of rigidly mounted, spaced uprights 11 and 12 constituting together an upstanding column structure that supports for bodily movement a rotatable horizontally disposed tool carrying spindle 13.

To provide for adjustment of the position of a cutting tool carried by the spindle 13 horizontally or vertically, the spindle is rotatably mounted in an axially movable quill 14 that is slidably mounted for endwise adjustment within a spindle block or carrier 15 which is, in turn, slidably mounted for vertical movement between the uprights 11 and 12 constituting the column structure, the arrangement being such that the cutter may be moved to any position in a vertical axial plane within the limits of the machine. Both vertical and horizontal adjustment of the spindle 13 may be effected by means of screw and nut mechanisms, as shown in the previously mentioned patents, or by any other well known adjusting means, suitable locking mechanisms being provided for clamping both the spindle block 15 and the quill 14 in the adjusted position. The spindle block 15 likewise serves to support the usual pair of overarms 16 that are slidably mounted in the block above the quill 14 in well known manner.

Power for rotating the spindle 13 to drive a cutting tool carried thereby may be derived from a motor (not shown) ordinarily mounted within the hollow base 10, as described in the previously mentioned patents, and operatively connected by means of speed changing gearing to effect rotation of the spindle at a selected speed, in well known manner.

On the upper surface of the bed 10 in front of the uprights 11 and 12 constituting the column structure, is slidably mounted a reciprocating work-supporting table 20 guided for horizontal movement along the bed in a path transverse to the axis of the tool spindle 13 and in position to move a workpiece supported thereon in cooperating relationship with a tool carried by the spindle.

Power for reciprocating the table 20 is likewise derived from the motor in the base of the machine, in the manner described in the previously mentioned patents, and may be transmitted to the table for moving it at a selected one of a plurality of feed rates by means of a transmission mechanism including a feed screw driven by a feed rate changer 21. For moving the table at rapid traverse rate, a rapid traverse selector or clutch 22, shown diagrammatically in Fig. 3 constituting a rate changing mechanism, may be engaged selectively, the feed train and rapid traverse train being generally similar to the corresponding mechanisms shown in the previously mentioned patents.

Manual control of the power movement of the work-table 20 may be effected by means of a control lever 24 pivotally mounted on the front of the machine as shown in Fig. 1 and arranged for movement in two planes. When the lever 24 is moved either to the right or to the left from the central neutral position shown in the drawings, the work-table 20 is caused to move in the corresponding direction, the arrangement being such that when the lever is moved inward toward the machine, movement of the table will occur at feed rate, while if the lever is moved outward or away from the machine, the movement will occur at rapid traverse rate, the operation being in accordance with the inventions set forth and claimed in the previously mentioned patents. Likewise, automatic change in the rate of movement of the table may be effected by means of trip dogs carried by the table 20 and acting upon a vertically movable trip post 25, while the movement of the table may be stopped by means of stop dogs arranged to engage the arms of a rotatable tripping sleeve 26, as fully explained in the patents.

Figure 3:
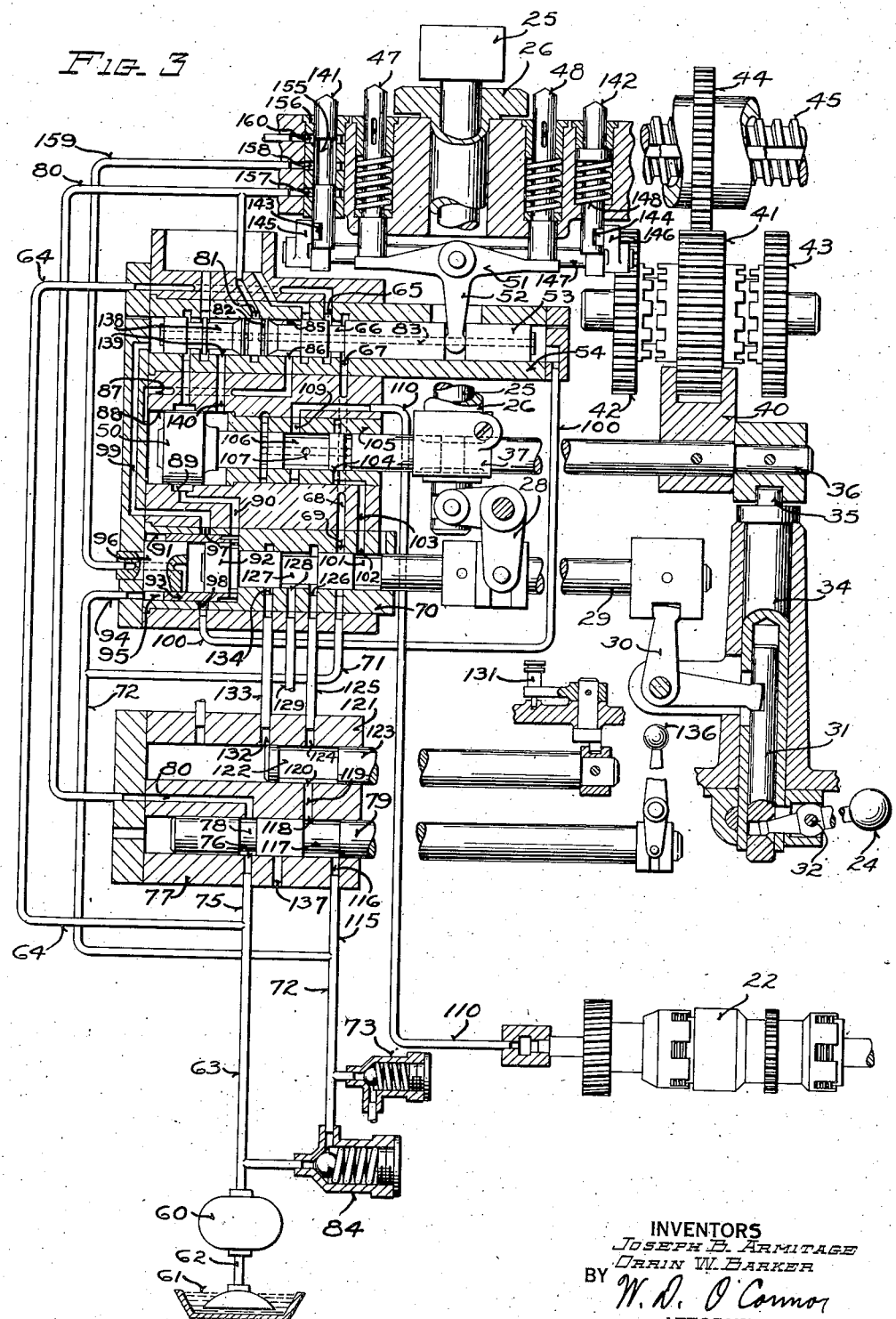
Fig. 3 is a schematic or diagrammatic view of the hydraulic control system associated with the machine shown in Fig. 1, fragments of the valve mechanism being shown in vertical section.

Referring now to the control apparatus shown diagrammatically in Fig. 3, upward movement of the trip post 25 corresponds to outward movement of the control lever 24 and results in operation of the table at rapid traverse rate. As shown, the trip post 25 is provided at its lower end with a slot engaging one arm of a bell crank 28 the other arm of which engages a slot in a shoe fixed on a horizontally disposed rapid traverse control valve rod 29. The rod 29 is further provided with another shoe having a slot engaging one arm of a bell crank 30, the other arm of which engages a slot in a control rod 31 associated with the lever 24. As previously mentioned, the lever 24 is pivoted for in and out movement, being mounted on a pivot pin 32 with its inner end engaging an opening in the control rod 31, the arrangement being such that when the lever 24 is moved to its inner position as shown in Fig. 3, the trip post 25 is moved to its lower position as previously explained and the rapid traverse valve rod 29 is moved to the right to feed position.

The previously mentioned sidewise movement of the lever 24 also effects turning movement of the tripping sleeve 26, the pin 32 pivotally supporting the lever being fixed in a bracket carried by and effecting connection with a rotatable sleeve 34 which incloses the control rod 31 and is arranged to be turned by sidewise movement of the lever 24. As shown, the sleeve 34 is provided at its inner end with an eccentric pin 35 which engages a shoe carried by a reversing shifter rod 36. Furthermore, the shifter rod 36 is provided with a slot engaging an arm 37 carried on the lower end of the tripping sleeve 26, the arrangement being such that when the lever 24 is moved from side to side, the shifter rod 36 is moved axially to effect reversal and the sleeve 26 is turned about its axis.

The shifting rod 36 carries a reversing and disconnecting shifting fork 40 which engages a reversing clutch gear 41 and is operative to move the clutch gear from the neutral position shown into engagement with either one of two complementary driving clutch gears 42 and 43, the arrangement constituting a reversing and disconnecting mechanism. When the clutch gear 41 is engaged with one of the driving clutch gears it will be driven thereby and will turn an intermeshing sleeve gear 44 that slidably receives and drives a table screw 45 in well known manner to effect movement of the table 20 in the one or the other direction. Engagement of the complementary reversing clutch gears may be effected manually by movement of the hand lever 24 to the right or to the left from its central neutral position to effect corresponding movement of the table and the table movement may be stopped automatically at predetermined positions by means of stop dogs operative to engage the tripping sleeve 26 to turn it in manner to move the clutch gear 41 to its neutral position, as more fully explained in the patents previously referred to.

To provide for effecting automatic reversal in the direction of movement of the table 20, a pair of reversing trip posts or plungers 47 and 48 are disposed respectively at opposite sides of the trip sleeve 26, in positions to be engaged and depressed by reversing trip dogs such as the dog 49, carried by the table, the arrangement being such that hydraulic pressure may thereby be applied to the one or the other side of a reversing piston 50 fixed on one end of the reversing shifter rod 36, as may be required to effect the reversal. As shown in Fig. 3, the reversing plungers 47 and 48 are spring urged to neutral or central position and act respectively upon the ends of a medially pivoted lever 51. The lever 51 is provided with a depending arm 52 the lower end of which engages a slot in a reversing valve plunger 53 fitted in a reversing valve casing 54, the arrangement being such that when the trip plunger 47 is depressed, the valve plunger 53 is moved to the right, and when the plunger 48 is depressed the valve plunger is moved to the left.

Pressure fluid for actuating the automatic reversing mechanism is derived from a pump 60 which withdraws fluid from a sump 61 through a conduit 62 and forces it under pressure through a conduit 63 and a conduit 64 to a port 65 in the reversing valve casing 54. From the port 65, the fluid flows through a groove 66 in the reversing valve plunger 53 to a port 67 in the casing which communicates with a conduit 68 leading to a port 69 in a valve casing 70 associated with the rapid traverse valve plunger 29, and thence through a conduit 71 and a conduit 72 to a low pressure relief valve 73 from which the pressure liquid may escape, preferably into the lubricating system of the machine, the pressure within the pump 60 and the connected pressure system being determined by the setting of the relief valve 73. From the pump pressure conduit 63, another passageway leads to the reversing valve casing 54 through a conduit 75, a port 76 of a spindle control valve 77, a groove 78 of an associated valve plunger 79, and a conduit 80 leading to a pressure port 81 in the reverser valve casing 54.

When one of the reversing trip plungers 47 or 48 is depressed by a reversing dog, pressure is applied to the appropriate side of the reversing piston 50 to effect reversal. For example, if the table 20 is moving from right to left, as shown in Fig. 1, and the reversing dog 49 engages the reversing plunger 48, at the end of the course of travel of the table, the plunger 48 will be depressed and the reversing valve plunger 53 will be moved to the left. This results in bringing a narrow groove 82 in the plunger into communication with the pressure port 81, whereupon the pressure fluid flows longitudinally through a channel 83 in the plunger 53 to the right end of the valve casing 54, thereby exerting force on the right end of the plunger in manner to move it to the left quickly to effect the reversing operation promptly. Movement of the plunger 53 from its neutral position also causes the groove 66 therein to move out of communication with the port 65, thereby preventing the escape of pressure fluid through it into the port 67 and the conduit 68 leading to the low pressure relief valve. This causes the pressure in the pump and in the conduit 80 to build-up to a high pressure determined by the setting of a high pressure relief valve 84 connected to the pump conduit 63 and discharging into the low pressure conduit 72. Further movement of the valve plunger 53 to the left brings a groove 85 in the plunger into communication with the pressure port 81 and permits the high pressure fluid to flow into a port 86 that is connected by a conduit 87 to the left end of a cylinder 88 within which the reversing piston 50 is fitted for sliding movement. The high pressure in the left end of the cylinder 88 then causes the piston 50 to move quickly to the right thereby engaging the reversing clutch gear 41 with the clutch gear 43 in manner to effect movement of the table to the right.

Since under some circumstances it is desired that the movement in the opposite direction be caused to take place at rapid traverse rate, as set forth in the previously mentioned patents, the reversing cylinder 88 is provided with a medial port 89 which is uncovered when the reversing piston 50 approaches the end of its stroke in either direction, thereby establishing communication with a conduit 90 leading to an actuating cylinder 91 associated with and formed in one end of the rate changing or rapid traverse valve casing 70. The pressure fluid escaping into the cylinder 91 then acts upon a piston 92 therein, which is carried by the rapid traverse valve plunger 29, and functions in manner to move the plunger to the left to rapid traverse position, thereby moving the tripping post 25 upward and the hand lever 24 outward. As shown in Fig. 3, the piston 92 is encircled by a valve sleeve 93 which is yieldably urged to the right at all times by means of low pressure fluid derived from the low pressure conduit 72 through a branch conduit 94 which leads to an annular chamber 95 formed circumferentially of a stationary plug 96 fitted within the sleeve 93 and constituting part of the left end of the cylinder 91. After the piston 92 on the rapid traverse valve plunger 29 has been moved to the left to the full extent, the pressure within the cylinder 91 builds up to the high pressure determined by the setting of the high pressure relief valve 84 and exerts sufficient force upon the right end of the sleeve 93 to overcome the force exerted by the low pressure fluid upon the left end thereof. This results in moving the sleeve 93 to the left to a position in which it uncovers and establishes communication between a port 97 and a port 98 diametrically disposed in the wall of the cylinder 91, thereby establishing communication between a conduit 99 leading to the left end of the reversing valve casing 54 and a conduit 100 leading to the right end of the casing 54 for equalizing the pressures on the ends of the reversing valve plunger 53 to permit it to be returned to its neutral position by the self-centering spring urged tripping plungers 47 and 48.

With the reversing valve in central position and the rapid traverse control valve plunger 29 in the left position as a result of a reversing action, a low pressure fluid circuit is established through the conduits 63 and 64, the port 65, groove 66, port 67 and conduit 68 to the port 69 in the rapid traverse valve casing, and thence by way of a groove 101 in the rapid traverse plunger 29, a port 102, and a conduit 103 to a port 104 in a valve casing 105 encircling the reverse shifter rod 36. With the reversing mechanism shifted to the right as previously described, the port 104 communicates with a groove 106 in the shifter rod 36 which is in register with a port 109. From the port 109 a conduit 110 leads to the fluid pressure actuated rapid traverse clutch 22, which may be generally similar in structure to the clutch mechanism more fully described and claimed in the co-pending application of Joseph B. Armitage, Serial No. 86,559, filed June 22, 1936 and entitled Machine tool, that issued September 24, 1940 as Patent No. 2,215,684 the arrangement being such that when pressure is applied to the clutch mechanism 22, a multiple plate friction clutch is engaged to operate the table 20 at rapid traverse rate in the direction determined by the position of the reversing clutch gear 41.

Since it is sometimes desirable that the cutter spindle be stopped whenever the table is operated in reverse direction at rapid traverse rate, in order to avoid marring the workpiece by the rotating cutter, the rapid traverse valve is provided with additional ports which function to stop the spindle automatically simultaneously with engagement of the rapid traverse drive. As shown in Fig. 3, fluid pressure for controlling the main or spindle driving clutch is derived from the low pressure supply conduit 72 through a conduit 115 leading to a port 116 in the spindle control valve 77. With the spindle control valve plunger 79 in the position shown, the port 116 communicates through a groove 117 in the plunger with a port 118 which is connected by a short channel 119 to a port 120 in the casing 121 of a spindle stop selector valve. As shown, the port 120 communicates through a groove 122 in a selector valve plunger 123 with a port 124 which is connected by means of a conduit 125 with a port 126 in the rapid traverse valve casing 70. The port 126 is, in turn, connected by means of a groove 127 in the rapid traverse valve plunger 29 with a port 128 that communicates with a conduit 129 leading to the main clutch control mechanism, as more fully described in the previously mentioned patents. With the various valves in the positions shown, fluid at low pressure from the supply conduit 72 flows through them into the conduit 129 and operates to maintain the main clutch in engagement to drive the spindle. When the rapid traverse valve plunger 29 is moved to the left to engage the rapid traverse drive, the groove 127 is moved out of communication with the port 126 thereby cutting off the fluid pressure supply to the conduit 129 and causing the main clutch to be disengaged.

In the event that it is desired to effect automatic reversal without stopping the spindle, the selector valve plunger 123 may be moved to the left by manipulating a control lever 131, shown on the front of the machine in Fig. 1. This causes the groove 122 in the plunger 123 to move into register with another port 132 into which the pressure fluid flows from the port 120 and thence by way of a conduit 133 to a port 134 in the rapid traverse valve casing 70. When the rapid traverse valve plunger 29 is moved to the left to rapid traverse position, the groove 127 therein registers with the port 134 and provides an alternative source of pressure communicating with the port 128 and the clutch controlling conduit 129 thereby functioning to retain the main clutch in engaged position.

If it is desired to disengage the main clutch manually, the clutch controlling valve plunger 79 may be moved to the left by means of a manually actuated clutch controlling lever 136, shown mounted on the front of the machine in Fig. 1 just below the reversing lever 24. With the plunger 79 in the left or stop position, the groove 117 is moved out of communication with the pressure port 116 and into communication with an exhaust port 137, thereby cutting off the pressure to the clutch controlling conduit 129 and causing the clutch to be moved to disengaged position. Movement of the plunger 79 to the left position likewise moves the groove 78 out of register with the high pressure port 76, thereby cutting off the supply of high pressure fluid for actuating the automatic reversing mechanism and preventing accidental reversal of the table should it be moved manually to a position in which a reversing dog engages a reversing plunger when the spindle is not running.

Automatic reversal in the direction of movement of the table 20 when it is moving from left to right is effected in corresponding manner by engagement of a reversing dog with the left hand reversing plunger 47. This results in moving the reversing valve plunger 53 to the right and thereby admitting high pressure fluid from the port 81 through a groove 138, a port 139 and a conduit 140 to the right end of the reversing cylinder 88 in manner to move the piston 58 and the shifting rod 36 to the left to engage the clutch gear 41 with the clutch gear 42 for driving the table from right to left. The operation of the reversing valve is in this instance similar to that previously explained although in the opposite direction, the rapid traverse valve plunger 29 being moved to rapid traverse position after the reversing action has taken place, and the reversing valve then being neutralized by movement of the neutralizing sleeve 93 to the left as previously explained.

Figure 2:
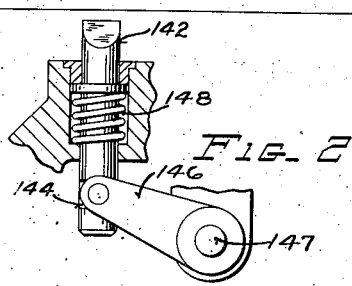
Fig. 2 is an enlarged detailed view of one of the control plungers, taken largely in vertical section along the line 2—2 in Fig. 1.

According to an important feature of this invention, the control mechanism may be adjusted to effect reversal at feed rate instead of at rapid traverse rate. For this purpose there are provided a pair of auxiliary or supplemental tripping plungers 141 and 142 arranged respectively adjacent to and at the left and right of the corresponding reversing plungers 47 and 48, as shown, the auxiliary plungers functioning when depressed to render the rapid traverse valve non-responsive to a reversing operation. The two auxiliary plungers 141 and 142 are interconnected for simultaneous movement in the same direction, the plungers being provided near their lower ends with slots 143 and 144, respectively, which are engaged by the ends of lever arms 145 and 146, as best shown in Fig. 2. The lever arms 145 and 146 are carried on the respective ends of an interconnecting rocking shaft 147, the arrangement being such that when either plunger is depressed it acts upon the corresponding arm to turn the rocking shaft, thereby causing the other plunger to be moved downward also. For retaining the plungers normally in raised position, the plunger 142 is provided with a compression spring 148 that retains it in its upper position and, by means of the interconnecting rocking shaft 147, retains the plunger 141 in the upper position likewise.

When it is desired to effect automatic reversal in the direction of table movement at feed rate instead of at rapid traverse rate when a reversing plunger is depressed, the corresponding auxiliary plunger is depressed simultaneously with downward movement of the reversing plunger thereby actuating interlocking mechanism rendering the rate changing valve nonresponsive. For this purpose a special, combined reversing dog, such as the dog 151 shown in Fig. 1 may be provided, the combined dog presenting two inclined surfaces 152 and 153 disposed, respectively, to engage the reversing plunger 47 and the auxiliary plunger 141 for depressing both of them simultaneously. Referring now to Fig. 3, when the auxiliary plunger 141, for example, is depressed by the sloping surface 153 of the dog 151, it establishes a hydraulic connection which prevents movement of the rapid traverse valve plunger 29 to the rapid traverse position when the reversing valve is actuated by the corresponding reversing plunger 47.

As shown, the auxiliary plunger 141 constitutes a valve plunger presenting a cannelure 155 and sliding within a cooperating valve casing 156. When the auxiliary plunger 141 is moved downward to cause the reversal to occur at feed rate, fluid at high pressure flows from the high pressure conduit 80 through a port 157 in the valve casing 156, which is then connected by the cannelure 155 with a port 158 leading into a conduit 159. The conduit 159 leads through the stationary plug 96 in the left end of the rapid traverse cylinder 91 and permits the high pressure fluid to exert force on the left face of the piston 92 on the rapid traverse valve rod 29 to render it inoperative. Since the area of the left face of the piston 92 is greater than the effective area of the right face thereof, the piston will be prevented from moving to the left under the influence of pressure admitted from the reversing cylinder through the conduit 90, thereby retaining the valve plunger 29 in feed position and preventing engagement of the rapid traverse clutch 22. However, the neutralizing action of the sleeve 93 will not be interfered with, as it will be moved to the left by the high pressure fluid admitted through the conduit 90 into the right end of the cylinder 91, since the left end of the annular chamber 95 is connected at all times to the low pressure conduit 94, thereby neutralizing the reversing valve plunger 53, as previously explained.

For effecting reversal of the table at feed rate in the other direction, a dog similar to but arranged oppositely from the dog 151 may be provided for depressing the right reversing plunger 48 and the corresponding auxiliary plunger 142 simultaneously. In this case the plunger 141 is also moved downward by the connecting linkage as before explained, the cannelure 155 establishing communication from the pressure port 157 to the port 158 and the conduit 159 leading to the left end of the rapid traverse actuating cylinder 91, to restrain the rapid traverse valve plunger 29 from movement to rapid traverse position. In order to effect reversal at rapid traverse rate, it is merely necessary to substitute for the special dog 151, a standard reverse dog 49, whereupon the dog 49 will pass over the auxiliary plunger 141 or 142 as the case may be and engage the corresponding reversing plunger 47 or 48. In this event, the auxiliary plunger 141 will remain in the upper position, as shown in Fig. 3 with the pressure port 157 closed and the port 158 connected by the cannelure 155 with an exhaust port 160, whereupon fluid in the left end of the rapid traverse cylinder 91 may be forced out through the conduit 159, the port 158, the cannelure 155 and escape through the exhaust port 160 when the piston 92 is moved to the left in moving the rapid traverse valve plunger 29 to rapid traverse position.

Figure 6:
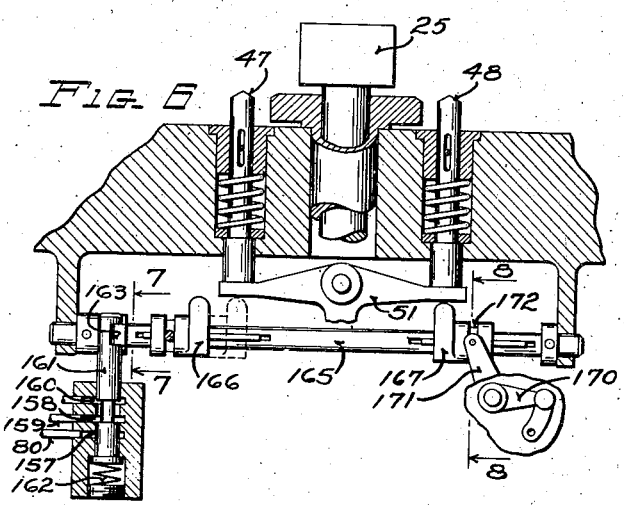
Fig. 6 is a fragmentary view largely in vertical section, of trip mechanism generally similar to that shown in Figs. 1 and 3 but embodying a further modification of the invention.
Figure 7:
Fig. 7 is a detailed view of part of the trip mechanism taken generally in vertical section along the line 7—7 in Fig. 6; and, Fig. 8 is a detailed view of another part of the trip mechanism taken generally in vertical section along the line 8—8 in Fig. 6.
Figure 8:
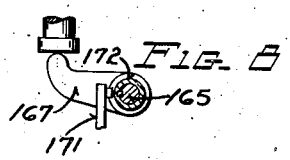

As a modification of this invention, the auxiliary plungers 141 and 142 may be dispensed with and interlocking means provided for actuating the auxiliary control valve selectively directly from the respective reversing plungers 47 and 48. As shown in Figs. 6, 7 and 8, this may be accomplished by providing a valve plunger 161 corresponding generally to the auxiliary plunger 141 shown in Fig. 3, and functioning in the like manner. As shown in Fig. 6, the valve plunger 161 is urged to its upward position by a spring 162 and is provided at its upper end with a slot 163 that is engaged by the outer end of an arm 164 fixed on a rocking shaft 165, as best shown in Fig. 7. The rocking shaft 165 carries a pair of arms 166 and 167 which are slidably keyed thereon and arranged to be moved longitudinally therealong into or out of position beneath the respective reversing plungers 47 and 48, as indicated in Fig. 6.

When one of the arms, for example the arm 167 is moved into position beneath its corresponding reversing plunger 48, and the reversing plunger is depressed by a reversing dog, the arm is depressed by the plunger acting upon the end of the lever 51, as indicated in Fig. 8, and causes the rocking shaft 165 to turn, thereby moving the valve plunger 161 downward for establishing a connection from the pressure port 167 to the conduit 159 to prevent operation of the rapid traverse valve as previously explained. For moving the arms 166 and 167 into and out of register with the corresponding reversing plungers, two shifting levers 170 (only one of which is shown) may be provided on the front of the machine, each being connected with an arm 171 which engages a slot 172 in the corresponding tripping arm, whereby the tripping arm may be moved along the rocking shaft 165 by turning the lever 170 from one to the other position.

Although hydraulic means have been shown for preventing movement of the rapid traverse valve when it is desired to effect reversal at feed rate, it is to be understood that other means may be employed to achieve the same result, for instance mechanical means may be used to prevent movement of the rapid traverse valve, as might be accomplished by providing on the table 20 a special dog which would positively prevent upward movement of the tripping post 25 at the time of reversal.

Figure 4:
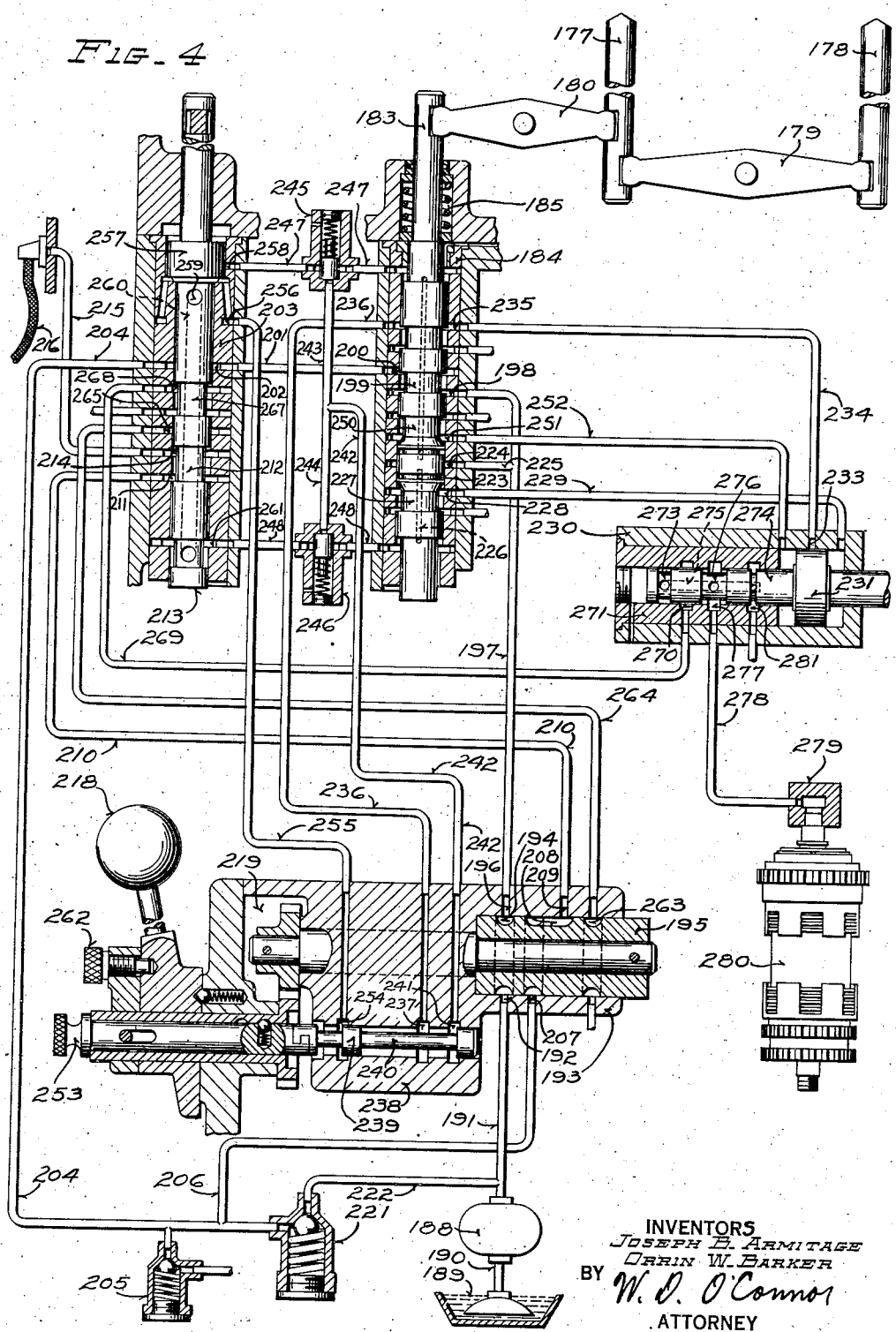
Fig. 4 is a schematic view, generally similar to Fig. 3, but showing a hydraulic control system incorporating a modification of the invention.

The embodiment of the invention shown diagrammatically in Fig. 4 is a hydraulic control system generally similar in operation to that shown in Fig. 3, but more particularly adapted for use in a milling machine of the knee and column type, as disclosed in the previously mentioned Patent No. 2,215,684. In this embodiment, the automatic reversing action is effected in manner similar to that previously explained by means of reversing dogs arranged to engage one or the other of a pair of reversing plungers 177 and 178 that are interconnected by means of a medially pivoted link 179 for simultaneous movement in opposite directions respectively. As shown, the plunger 177 is connected by means of a medially pivoted link 180 to actuate a vertically disposed reversing valve plunger 183 within its cooperating valve casing 184, a spring 185 being provided on the valve plunger to retain it and the interconnected reversing plungers 177 and 178 normally in central or neutral position. The arrangement and operation of the plungers 177 and 178 and the reversing valve plunger 183 is generally similar to that of the reversing valve and actuating plungers shown and more fully described in the previously mentioned Patent No. 2,215,684.

Fluid pressure for actuating the control apparatus is, in this instance, derived from a pump 188 which withdraws fluid from a sump 189 through a conduit 190 and forces it under pressure into a conduit 191 leading to a port 192 in a spindle clutch controlling valve casing 193. From the port 192 the pressure fluid passes through a groove 194 in a rotary valve plug or rotor 195 fitted within the casing 193, and thence to a port 196 in the casing connected by a conduit 197 to a port 198 in the reversing valve casing 184. With the reversing valve plunger 183 in the neutral position as shown, a groove 199 therein effects communication between the port 198 and a port 200 which is connected by a conduit 201 to a port 202 in a rapid traverse valve casing 203. From the port 202 another conduit 204 leads to a low pressure relief valve 205 through which the pressure fluid may escape, preferably into the lubricating system of the machine.

From the low pressure conduit 204 another conduit 206 leads to a port 207 in the spindle control valve casing 193 which is connected by a groove 208 in the valve rotor 195 with a port 209, when the valve is in the position shown. From the port 209, a conduit 210 leads to a port 211 in the rapid traverse valve casing 203, which is then connected by a groove 212 in a cooperating rapid traverse valve plunger 213 with a port 214. From the port 214, the low pressure fluid flows through a conduit 215 into a flexible conduit 216 which leads to a relay valve (not shown) arranged to control the operation of the main clutch of the machine, as fully set forth and claimed in the previously mentioned Patent No. 2,215,684. Manual control of the main clutch may be effected by means of a control lever 218 mounted on the front of the machine and operatively connected by intermeshing gearing 219 to rotate the spindle controlling valve rotor 195 within the casing 193 in such manner that the fluid pressure source may be connected to or disconnected from the conduit 216 leading to the clutch actuating relay by sidewise movement of the lever 218 from one position to another as fully explained in the patent.

If now, one of the reversing plungers, for example the plunger 177, is depresed by a reversing dog, the reversing valve plunger 183 will, in this instance, be moved upward thereby moving a narrow groove 223 therein into communication with a pressure port 224 which is connected by a conduit 225 with the pressure conduit 191. The pressure liquid from the port 224 then flows through a conduit 226 extending longitudinally of the valve plunger 183 to the lower end of the valve casing 184, the pressure exerting force upon the lower end of the plunger to move it quickly to its upper position. Upward movement of the reversing valve plunger 183 also moves the groove 199 out of communication with the port 198 thereby preventing the flow of pressure fluid from the pump 188 to the low pressure relief valve 205. This results in the pressure being built-up in the conduits 191 and 197 to a high pressure that is determined by the setting of a high pressure relief valve 221 which is connected by a conduit 222 with the pump conduit 191, the excess liquid then escaping into the low pressure system to be eventually discharged through the low pressure relief valve 205.

When the plunger 183 is moved to its upper position, a groove 227 in the plunger is brought into communication with the pressure port 224 and connects it with a port 228 from which a conduit 229 leads to the right end of a reversing cylinder 230. The high pressure fluid admitted to the right end of the cylinder 230 acts upon a reversing piston 231 therein in manner to move it to the left to shift the reversing clutch for effecting movement of the machine table in the opposite direction, as fully explained in the previously mentioned Patent No. 2,215,684.

After the reversing clutch has been engaged and the piston 231 approaches the left end of the cylinder 230, it uncovers a port 233 at the middle of the cylinder through which the high pressure liquid flows into a conduit 234 leading to a port 235 in the reversing valve casing 184. From the port 235, a conduit 236 leads to a port 237 in a selector valve casing 238 associated with the spindle controlling valve mechanism and slidably receiving a valve plunger 239. The selector valve plunger 239 functions to determine the rate at which automatic reversal will occur, and with the plunger in the position shown, reversal of the machine table will occur at feed rate. As shown, a cannelure 240 in the plunger 239 effects a connection from the port 237 to a port 241 from which a conduit 242 leads to branch conduits 243 and 244 respectively connected to auxiliary neutralizing valves 245 and 246. The high pressure liquid in the branch conduits 243 and 244 acts upon spring pressed pistons in the neutralizing valves 245 and 246 in manner to move them to open position thereby establishing communication through conduits 247 and 248 with the upper and lower ends respectively of the reversing valve casing 184. This neutralizes the pressures upon the ends of the reversing valve plunger 183 and permits it to move to its central position under the influence of the neutralizing spring 185, thereby re-establishing communication from the pressure port 198 to the port 200 which permits escape of the high pressure fluid through the low pressure relief valve 205 and re-establishes the conditions which obtained in the system prior to the beginning of the reversing operation.

To effect reversal from movement in the opposite direction, the reversing plunger 178 may be depressed by a reversing dog thereby moving the reversing valve plunger 183 downward and establishing communication from the pressure port 224 through a groove 250 in the valve plunger to a port 251 which is connected by a conduit 252 with the left end of the reversing cylinder 230. When the reversing piston 231 is then forced to the right by the pressure in the left end of the cylinder, the reversing clutch is shifted to the opposite position and the port 233 is again uncovered to permit flow of the high pressure fluid through the conduit 234, the port 235 and the conduit 236 to the port 237 of the selector valve 238.

If in this instance it is desired to effect the reversal at the rapid traverse rate, the selector valve 239 is moved to the left by pulling outward on a selector actuating knob 253 thereby causing the cannelure 240 to establish communication from the pressure port 237 to a port 254 from which a conduit 255 leads to a port 256 in the casing 203 of the rapid traverse valve. The pressure admitted through the port 256 then acts upon the lower face of a piston 257 on the rapid traverse valve plunger 213 in manner to move it to its upper or rapid traverse position. When the piston 257 is moved to its upper position, it uncovers a port 258 in the valve casing through which fluid flows into the conduit 247 leading to the upper end of the reversing valve casing 184, and at the same time a port 259 in the rapid traverse valve plunger 213 moves into communication with the port 256 and thereby establishes connection through a longitudinal passageway 260 in the plunger 213 with a port 261 at the lower end of the casing 203 which communicates with the conduit 248 leading to the lower end of the reversing valve casing 184. This results in prearranging part of a neutralizing circuit for equalizing the pressure on the ends of the reversing valve plunger to permit it to return to its neutral position, the valves 245 and 246 functioning meanwhile to prevent the neutralizing action until after the rapid traverse valve has moved to its upper position.

With the rapid traverse valve plunger 213 in the upper position, the groove 212 therein is moved out of communication with the port 211, thereby disconnecting the pressure source from the port 214 and the conduit 215 leading to the pilot valve of the main clutch, to cause the clutch to be disengaged for stopping the cutter spindle during the reversing movement. In the event that it is not desired to stop the spindle automatically upon reversal, a control knob 262 associated with the spindle control lever 218 is withdrawn and moved angularly to position the valve rotor 195, as explained in the previously mentioned patent No. 2,215,684, for establishing connection from the low pressure port 207 to a port 263 from which the pressure fluid flows through an alternative conduit 264 to a port 265 which is then connected by the groove 212 with the port 214 for maintaining pressure in the conduit 215 to retain the main clutch in engagement.

When the rapid traverse valve plunger 213 is in the upper position, a connection is effected for engaging the rapid traverse clutch, that extends from the low pressure port 202 in the casing 203 through a groove 267 in the plunger which then registers with it, to a port 268 that is connected by a conduit 269 with a port 270 in the casing 271 of a valve associated with the reversing piston 231. With the piston 231 in its extreme right position, a groove 273 in a cooperating valve plunger 274 connected to the piston, is in register with the port 270 and is connected by means of a longitudinal passageway 275 through the plunger to a groove 276 which communicates with a port 277 that is connected by a conduit 278 to a coupling member 279 constituting a rotatable connection with a rapid traverse clutch mechanism 280 generally similar to the clutch mechanism 22 shown in Fig. 3, the arrangement being such that when pressure is applied to the rotary coupling member 279, the clutch mechanism is engaged to drive the machine table at rapid traverse rate in the direction determined by the position of the reversing piston 231.

In order to prevent operation of the rapid traverse drive when the reversing clutch is in the neutral or disengaged position corresponding to the intermediate position of the piston 231 as shown, the valve plunger 274 is arranged to close the pressure port 270, when in this position, and to connect the rapid traverse port 277 with an exhaust port 281 in manner to relieve the pressure in the clutch mechanism and permit it to move to disengaged position. This interlocking arrangement prevents unnecessary operation of the rapid traverse drive mechanism by rendering it inoperative when the reversing clutch is in neutral position, and likewise assists in effecting reversal of the table from movement in one direction at rapid traverse rate to movement in the other direction, since the rapid traverse clutch is disengaged automatically upon movement of the reversing clutch to neutral position thereby reducing the speed of operation of the clutch to facilitate its engagement for movement of the table in the opposite direction.

In the embodiment of the invention shown in Fig. 4, the selector valve 239 provides for effecting reversal of the table at either rapid traverse rate or feed rate, the rate of reversal being the same at both ends of the course of travel of the table and depending upon the position of the selector valve. According to the modification of the invention shown diagrammatically in Fig. 5, the single selector valve 239 of Fig. 4 is replaced by two selector valves arranged to provide for automatic reversal of the table selectively at either rate at either end of its course of travel.

Figure 5:
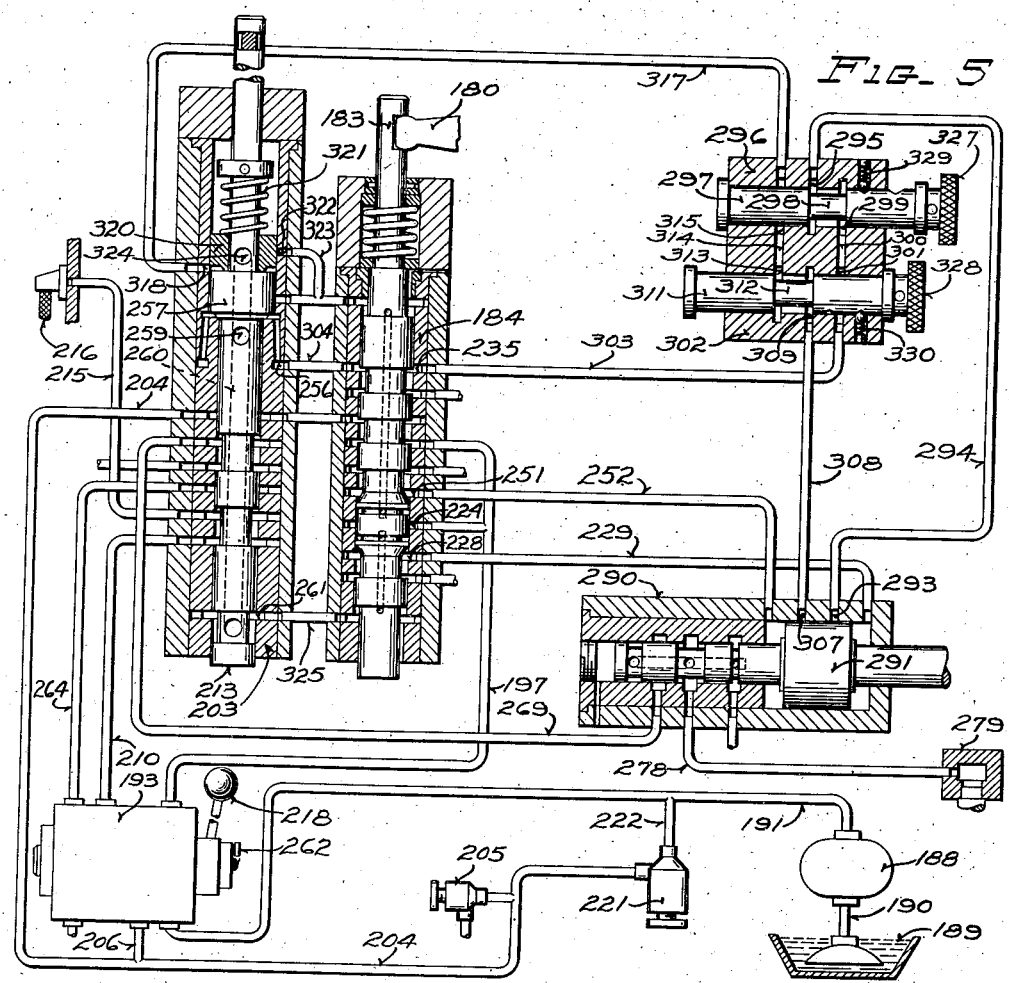
Fig. 5 is a schematic diagram of another control system generally similar to that shown in Fig. 4 but embodying still another modification of the invention.

Referring now to the control circuit shown diagrammatically in Fig. 5, if the table is assumed to be moving from left to right, the reversing trip plunger 177 will be depressed when engaged by a reversing dog, thereby moving the reversing valve plunger 183 upward and establishing a connection from the pressure port 224 to the port 228 which is connected to the conduit 229, as previously explained. The conduit 229 leads to the right end of a reversing cylinder 290, corresponding generally to the reversing cylinder 230 shown in Fig. 4, but longer than it and fitted with a relatively long reversing piston 291 which is connected to actuate the reversing clutch as previously explained. When the piston 291 is forced to the left by the pressure fluid in the right end of the cylinder, it engages the clutch to effect movement of the table to the left, and uncovers one of two ports in the midportion of the cylinder wall, in this case a port 293 leading into a conduit 294. The conduit 294 leads to a port 295 in the casing of a right end reversing selector valve 296 fitted with a cooperating plunger 297 having a cannelure 298 that, in the right hand position of the valve shown, connects the port 295 to a port 299 from which a short passageway 300 leads to an annular port 301 in the casing of a left end reversing selector valve 302. As shown, the port 301 is directly connected to a conduit 303 leading to the port 235 in the reversing valve casing 184 which is directly connected by means of a conduit 304 with the port 256 in the rapid traverse valve casing 203, the arrangement being such that the high pressure fluid flowing through the reversing cylinder 290 is admitted through the port 256 to exert pressure on the lower face of the rapid traverse valve piston 257 for moving it upward to rapid traverse position, with the result that the rapid traverse clutch is engaged and the reversing valve plunger 183 is neutralized, as previously explained.

If now it is assumed that the table in moving from right to left engages the reversing plunger 178 (Fig. 4) thereby moving the reversing valve plunger 183 downward as previously explained, the pressure port 224 is then connected to the port 251 from which the conduit 252 leads to the left end of the reversing cylinder 290. Upon the reversing piston 291 being moved to the right by the pressure in reversing the direction of movement of the table, it uncovers the other of the two ports in the cylinder wall, in this case a port 307 which is connected by a conduit 308 to a port 309 in the casing of the left end selector valve 302. A selector valve plunger 311 within the valve casing 302 is provided with a cannelure 312 which, when the valve is in the left position shown, effects communication between the port 309 and a port 313 that is connected by a short conduit 314 with an annular port 315 in the valve casing 296. As shown, the port 315 is directly connected to a conduit 317 which leads to a port 318 in the casing 203 of the rapid traverse valve at a position just above the actuating piston 257 and beneath a floating neutralizing piston 320, the pressure acting downward upon the piston 257 and rendering the rapid traverse valve inoperative. The neutralizing piston 320 is slidably mounted upon the rapid traverse valve plunger 213 within the upper part of the casing 203, and is normally retained in its lower position in contact with the piston 257 by means of a compression spring 321. However, when pressure is admitted from the conduit 317 through the port 318 to the lower face of the neutralizing piston 320, the piston is moved upwards away from the piston 257 against the resistance of the spring 321 to a position in which it uncovers a port 322 in the casing 203 which is connected by a conduit 323 to the upper end of the reversing valve casing 184. At the same time, the neutralizing piston 320 uncovers a port 324 in the rapid traverse valve plunger 213 that establishes communication through the longitudinal passageway 260 in the plunger 213 with the port 261 at the lower end of the rapid traverse valve casing which is directly connected by a conduit 325 with the lower end of the reversing valve casing 184, thereby establishing communication between the upper and lower ends of the reversing valve casing to neutralize the reversing valve plunger 183 as previously explained, but without moving the rapid traverse valve plunger 213.

As shown, the selector valve plungers 297 and 311 are each provided with actuating knobs 327 and 328, respectively, by means of which the valves may be moved independently to either one of two positions, as determined by spring actuated detent mechanisms 329 and 330. As previously explained, with the selector valve plungers in the positions shown in Fig. 5, reversal of the table from movement toward the right to movement toward the left will occur at rapid traverse rate, whereas reversal of the table from movement toward the left to movement toward the right will occur at feed rate. If now the valve plunger 297 is moved to its left position also, reversal will occur at feed rate at both ends of the course of travel, and conversely, if both of the plungers 297 and 311 are moved to their right positions, reversal will occur at rapid traverse rate at both ends of the course of travel. Accordingly, with this arrangement, it is apparent that reversal in the direction of movement of the table may be caused to occur selectively at either rapid traverse rate or feed rate at either end of its course of travel by suitably manipulating the selector valve knobs 327 and 328.

From the foregoing description of typical control apparatus embodying the present invention and the explanation of its operation, it should be apparent that there has been provided an improved control system for a machine tool actuating mechanism that is capable of effecting selective automatic control of the movements of a machine tool element, particularly with regard to automatic reversal in the direction of movement of the element at selected rates.

Although the several illustrative embodiments and modifications of the invention have been fully described for the purpose of setting forth various examples of operative embodying apparatus, it is to be understood that the particular structures and control systems herein described are intended to be illustrative only and that the various inventive features may be incorporated in other structural forms without departing from the spirit and scope of the invention as defined in the subjoined claims.

The principles of the invention having now been fully explained in connection with the foregoing description of the embodying apparatus, we hereby claim as our invention:

1. In a machine tool, the combination with a movable support and transmission mechanism for effecting movement of said support including means shiftable for effecting alternative opposite directions of movement and for effecting alternative feed or rapid traverse rates of movement, a first controller for effecting change in direction of movement independently of change in rate, a second controller for effecting change in rate of movement independently of change in direction, and control means selectively operable to effect operation of said rate changing controller in response to functioning of said direction changing controller, whereby movement after reversal may be effected at either feed rate or rapid traverse rate selectively.

2. In a machine tool, the combination of a tool support and a work support, a transmission for effecting relative movement of said supports including means for causing said relative movement to occur at feed rate or at rapid traverse rate alternatively and in alternate directions, and control mechanism for said transmission including a first manually operable controller for selecting the direction of movement independently of change in rate, a second controller manually operable for selecting the rate of movement independently of change in direction, a dog controlled means capable of effecting simultaneous change in both direction and rate, and selective control means operative to render said dog controlled means incapable of effecting change in rate simultaneously with change in direction.

3. In a machine tool having a tool support and a work support, the combination with a transmission for effecting relative movement of said supports including a feed rate train, a rapid traverse rate train, a selector shiftable to cause said relative movement to be effected alternatively by the one or the other of said trains, and a shiftable reverser operative to effect change in the direction of said relative movement, of control mechanism for said transmission including a first manually operable controller for operation of said reverser independently of said selector, a second manually operable controller for independent operation of said selector, a first dog operable control means for independently shifting said reverser and said selector, a second dog operable control means for substantially simultaneous operation of said selector and said reverser, and control means selectively operable to prevent operation of said selector by said second dog operated control means, whereby automatic reversal in the direction of said relative movement may be effected selectively by the one or the other of said trains.

4. In a machine tool having a tool support and a work support, the combination with a transmission mechanism for effecting relative movement of said supports, including a feed rate train, a rapid traverse rate train, a selector shiftable to connect the one or the other of said trains alternatively for effecting said relative movement, and a reverser shiftable to effect change in the direction of said relative movement, of control apparatus for said transmission mechanism including means responsive to said relative movement of said supports and capable of effecting simultaneous shifting of said reverser and said selector, and selectively actuatable control means capable of preventing shifting of said selector by said movement responsive control apparatus, whereby said change in direction of said relative movement may be effected selectively to cause reverse movement at either feed rate or rapid traverse rate.

5. In a machine tool, the combination with a plurality of relatively movable supports and power transmission and control mechanism for effecting relative movement of said supports, including reversing and interrupting mechanism and a selector shiftable to effect operation alternatively at feed rate or at rapid traverse rate, of a plurality of independently operable controllers for operating said reversing and interrupting mechanism and for shifting said selector respectively, other control apparatus including power operable means capable of simultaneously operating said reversing mechanism and said selector to reverse and change the rate of said transmission, and means controlling the operation of said power operable control means and selectively adjustable to render it incapable of operating said selector simultaneously with said reversing mechanism.

6. In a machine tool having a reciprocatory support, means for reciprocating said support at feed and rapid traverse rates alternatively, means for controlling said reciprocating means including means to reverse said support and means to change the rate of reciprocation of said support, pressure-fluid operated means responsive to movement of said support and operative upon said reversing means to effect reversal in the direction of movement of said support, other pressure-fluid operated means selectively responsive to operation of said reversing means and operative upon said rate changing means to effect change from feed rate to rapid traverse rate, and control means for rendering said rate changing fluid operated means responsive or non-responsive to said reversing means, whereby said support may be reversed into movement at feed rate or at rapid traverse rate selectively.

7. In a machine tool having a movable supporting member, the combination with power actuated means for moving said member, of a control system for said power actuated means comprising reversing mechanism disposed to be actuated by said member in the course of its movement and operative to cause reversal in the direction of movement effected by said power actuated means, rate changing mechanism disposed to be actuated by said reversing mechanism and operative thereby to cause a change in the rate of movement effected by said power actuated means, and selectively operable means adapted to render said rate changing mechanism non-responsive to said reversing mechanism, whereby reversal may be effected selectively to provide either one of two rates of movement.

8. In a control system for a movable machine tool member, the combination with hydraulically actuated direction reversing and rate changing apparatus, of a hydraulic reversing control valve operative upon arrival of said movable member at either of two predetermined terminal positions to actuate said hydraulic reversing apparatus, a rate changing control valve selectively operable in response to operation of said reversing valve and effective to control the rate at which reverse movement occurs, and control means selectively operable to render said rate changing control valve non-responsive to operation of said reversing valve.

9. In a machine tool having a reciprocating supporting member, the combination with power actuated means for moving said member, of a hydraulic control system for said power actuated means including a reversing valve disposed to be moved by said member in the course of its travel and operative to effect reversal in the direction of movement of said member, a rate changing valve responsive to movement of said reversing valve and operative to effect change in the rate of movement of said member upon reversal thereof, and a manually actuatable valve arranged to render said rate changing valve inoperative, whereby reversal may be caused to occur at either the same or a different rate selectively.

10. In a machine tool having a movable member, the combination with transmission mechanism including direction reversing and motion-interrupting means and rate changing means, of automatic control mechanism selectively operative to effect simultaneous operation of said reversing and said rate changing means, and control means constituting an interlocking connection arranged to render said rate changing means non-responsive to said automatic control mechanism whenever said reversing means is in motion-interrupting position.

11. In a machine tool having a movable member and driving means for said member including a reversing and disconnecting mechanism and rapid traverse drive mechanism, a control system responsive to movement of said reversing mechanism and functioning to render said rapid traverse drive mechanism inoperative whenever said reversing mechanism is in disconnecting position.

12. In an automatic reversing control system for a movable element of a machine tool, a reversing valve responsive to movement of said machine tool element and operative to effect reversal in its direction of movement, a rapid traverse valve responsive to movement of said reversing valve and operative to effect movement of said element at rapid traverse rate, and control means selectively operable to render said rapid traverse valve non-responsive to movement of said reversing valve.

13. In a machine tool having a movable element and driving mechanism therefor including a reverser, the combination with a reversing valve responsive to movement of said machine element and operative to actuate said reverser for effecting reversal in the direction of movement of said element, a rapid traverse valve responsive to movement of said reversing valve and operative to effect movement of said element at rapid traverse rate, a valve associated with said reverser and operative to prevent movement of said rapid traverse valve by said reverser valve prior to completion of a reversing movement, and a manually actuatable valve selectively operable to prevent actuation of said rapid traverse valve by said reversing valve at any time.

14. In a control system for a movable member, the combination with power operated means for moving said member, of trip dogs carried by said member, a pair of dog actuated plungers respectively operable when engaged by dogs on said member to effect reversal in the direction and simultaneous change in the rate of movement of said member at opposite ends of its path of movement respectively, and a pair of auxiliary plungers associated respectively with said reversing plungers and operative when engaged by dogs on said member at the time of reversal to render said reversing plungers inoperative to change the rate of movement of said member upon reversal thereof.

15. In a machine tool control system, the combination with a movable member of a machine tool, of a pair of trip plungers arranged to effect automatic reversal in the direction of movement of said member and responsive respectively to movement thereof to predetermined terminal positions, and a pair of control members associated with said reversing plungers and selectively engageable for actuation thereby to control the rate at which reverse movement of said member occurs.

16. In a machine tool having a movable member and driving means for said member including a direction reverser, and a rate changer, control means responsive to movement of said member and operative to actuate said reverser for effecting reversal in the direction of movement of said member, control means responsive to movement of said reverser to each reversing position respectively and operative to actuate said rate changer for effecting change in the rate of movement of said member in the reverse direction, and means for rendering inoperative each of said rate changing control means selectively, whereby automatic reversal may be caused to occur at either rate at either end of the course of travel of said member.

17. In a machine tool having a movable member, a power transmission mechanism for moving said member including rate changing and reversing mechanism, hydraulic control apparatus for controlling said transmission mechanism including a reversing valve adapted to be moved in opposite directions respectively at the ends of the path of travel of said movable member and operative to control said reversing mechanism, a rate changing valve operative to control said rate changing mechanism, a pair of control conduits leading from said reversing valve to said rate changing valve and operative respectively to actuate said rate changing valve upon movement of said reversing valve to its respective reversing positions, and a selective control valve in each of said control conduits said control valves being operative respectively to control the actuation of said rate changing valve upon reversal of said member at the opposite end of its travel, whereby said member may be reversed automatically into movement in reverse direction at a predetermined rate at either end of its path of travel.

18. In a machine tool having a movable member and driving mechanism for said member including rate changing and direction reversing mechanism, the combination with a source of pressure fluid and a reversing valve responsive to movement of said member and operative to actuate said reverser for effecting reversal in the direction of movement of said member, of a rapid traverse valve operative to control said rate changing mechanism to effect movement of said member at feed rate or at rapid traverse rate, a pair of control conduits leading from said reversing valve to said rapid traverse valve, a valve associated with said reverser and operative upon movement thereof to each reversing position to admit fluid pressure from said reversing valve into a corresponding one of said control conduits, and a manually actuatable valve connected in each of said conduits and selectively operable to admit said pressure fluid into said rapid traverse valve for actuating it to effect reversal into movement at rapid traverse rate, whereby reversal in the direction of movement of said movable member may be effected at either rate at either end of its course of travel in accordance with the adjustment of said manually actuatable valves.

19. In a machine tool, the combination with a movable support and driving apparatus for actuating said support including rapid traverse rate driving means and reversing and disconnecting means, of automatic control mechanism for controlling the movement of said support comprising trip means for effecting automatic reversal and simultaneous change in rate of movement of said support, and interlocking means rendering said trip means inoperative when said reversing and disconnecting means is in disconnecting position.

20. In a transmission and control mechanism for a movable element of a machine tool, the combination with selector means operative to effect movement of said element in either direction selectively and operative to stop said element, of means for driving said selector at feed rate, means for driving said selector at rapid traverse rate, and means for rendering said rapid traverse driving means inoperative whenever said selector means is in stop position, whereby engagement of said selector while being driven at rapid traverse rate is prevented.

21. A machine tool comprising a movable support, transmission mechanism for moving said support including means for effecting support movement in either direction, means for driving said transmission mechanism at either feed rate or rapid traverse rate selectively, control means for reversing and changing the rate of movement of said support, said control means being operative to stop said support, and interlocking means associated with said control means and operative to effect disengagement of the rapid traverse driving means from said transmission mechanism upon stopping said support, whereby when said support is started it will move at feed rate unless said control means is actuated to change the rate to rapid traverse.

22. In a machine tool having a base and a supporting element movably mounted on said base, means for moving said supporting element selectively in either direction at either feed rate or rapid traverse rate, a hydraulic control system for said element moving means including a hydraulically actuated reversing valve adapted to be moved in either direction from a central neutral position to effect movement of said supporting element in a corresponding direction, a rate changing valve adapted to be moved by fluid pressure under the control of said reversing valve to effect movement of said supporting element at rapid traverse rate subsequent to a reversing operation and simultaneously to effect a hydraulic connection functioning to return said reversing valve to its neutral position, means selectively operable to render said rate changing valve non-responsive to said reversing valve for effecting reverse movement at feed rate, and an auxiliary neutralizing valve operative when said rate changing valve is non-responsive to effect neutralization of said reversing valve subsequent to a reversing operation.

23. In a control system for a movable machine tool element, a hydraulically actuated control valve adapted to effect operation of said element in either direction selectively, means for applying hydraulic pressure to move said control valve in the one or the other direction from a central neutral position to select the direction of operation of said machine element, and two neutralizing valves associated respectively with the means for applying pressure to said control valve and operative subsequent to a direction selecting movement to apply equal pressures tending to move said control valve in each direction thereby neutralizing it for return to its neutral position.

24. In a control system for regulating the movement of a machine tool element, a control valve responsive to movement of said element, a hydraulically actuated reversing mechanism arranged to be operated in response to said control valve, a hydraulically actuated rate changing mechanism connected to and arranged to be operated in response to operation of said reversing mechanism in effecting reversal of movement of said machine element in either direction, and rate controlling valves in the connection between said reversing mechanism and said rate changing mechanism and operative selectively to permit or prevent operation of said said rate changing mechanism by said reversing mechanism, whereby said machine tool element may be reversed at either end of its stroke of travel either at the same rate or at a different rate selectively.

25. In a machine tool reversing control mechanism, the combination with power means for moving a machine tool element, of a hydraulic control valve operable to effect change in the rate of movement of said element, a dog actuated hydraulic control valve operable to effect reversal in the direction of movement of said element and connected to actuate said rate changing control valve simultaneously, and means selectively operable to disconnect said rate changing control valve from said reversing valve.

26. In a machine tool transmission and control mechanism, means for moving a machine tool element in either direction, means for driving said element moving means at either feed rate or rapid traverse rate, direction controlling means associated with said element moving means and operative to stop said element or to start it for movement in either direction selectively, rate controlling means associated with said driving means and operative to control the rate of driving said element moving means, and means interlocking said direction controlling means and said rate controlling means in such manner that when said direction controlling means is adjusted to stop said element said rate controlling means is automatically adjusted to cause driving of said element moving means to occur at feed rate.

27. In a machine tool, a movable element, means selectively operable to provide power for moving said element at feed rate or at rapid traverse rate, reversing and disconnecting mechanism connected to be driven by said power means at selected rate, and control means associated with said reversing and disconnecting mechanism and operative to prevent said power means from driving said reversing mechanism at rapid traverse rate when it is in disconnecting position, whereby starting or reversing of said machine element at rapid traverse rate is obviated.

28. In a machine tool control system for selecting the direction and rate of movement of a machine element, a hydraulically actuated reversing mechanism, a reversing valve adapted to control the operation of said reversing mechanism, valve means associated with said reversing mechanism and adapted to control the flow of pressure fluid into one or the other of two pressure conduits when said reversing mechanism is positioned to effect movement of said machine element in one or the other direction respectively, a rate changing valve operative in response to pressure exerted through either of said conduits to change the rate of movement of said machine element subsequent to a direction changing operation, and valve means in each of said conduits selectively operable to prevent operation of said rate changing valve, whereby reversal of the direction of movement of said machine element may be effected selectively into movement at either rate in either direction.

29. In a machine tool having a power actuated movable supporting member, hydraulically actuated means arranged to effect reversal of the direction of movement of said member, a hydraulic control system including a reversing valve operable to energize said hydraulic reversing means at predetermined points in the path of movement of said supporting member, a rate changing valve selectively operable upon movement of said reversing means to either of two reversing positions to change the rate of movement of said member, and selectively actuatable control valves respectively associated with each of said reversing positions of said reversing means and selectively operative to prevent operation of said rate changing valve, whereby reversal may be caused to effect reverse movement alternatively at either of two rates at either of said reversing positions.

JOSEPH B. ARMITAGE.
ORRIN W. BARKER.